(12) United States Patent
Miller

(10) Patent No.: US 9,322,998 B2
(45) Date of Patent: Apr. 26, 2016

(54) FIBER OPTIC CONNECTOR

(71) Applicant: Darrin Max Miller, Hickory, NC (US)

(72) Inventor: Darrin Max Miller, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 405 days.

(21) Appl. No.: 13/759,420

(22) Filed: Feb. 5, 2013

(65) Prior Publication Data

US 2014/0199027 A1 Jul. 17, 2014

Related U.S. Application Data

(60) Provisional application No. 61/752,697, filed on Jan. 15, 2013.

(51) Int. Cl.
*G02B 6/25* (2006.01)
*G02B 6/245* (2006.01)
*G02B 6/38* (2006.01)

(52) U.S. Cl.
CPC ............... *G02B 6/25* (2013.01); *G02B 6/3854* (2013.01); *G02B 6/3863* (2013.01); *B23K 26/082* (2015.10); *G02B 6/3846* (2013.01); *G02B 6/3885* (2013.01)

(58) Field of Classification Search
None
See application file for complete search history.

(56) References Cited

U.S. PATENT DOCUMENTS

| | | | |
|---|---|---|---|
| 5,216,734 A | 6/1993 | Grinderslev | |
| 5,278,928 A | 1/1994 | Ueda et al. | |
| 5,291,570 A | 3/1994 | Filgas et al. | 385/78 |
| 5,790,732 A | 8/1998 | Ueda | 385/84 |
| 6,282,349 B1 | 8/2001 | Griffin | 385/81 |
| 6,413,450 B1 | 7/2002 | Mays, Jr. | 264/1.27 |
| 6,738,544 B2 | 5/2004 | Culbert et al. | 385/33 |
| 6,774,341 B2 * | 8/2004 | Ohta | 219/121.72 |
| 6,792,008 B2 * | 9/2004 | Wolak et al. | 372/6 |
| 6,951,994 B2 | 10/2005 | Mays, Jr. | 219/121.67 |
| 6,960,027 B1 | 11/2005 | Krah et al. | 385/78 |
| 6,963,687 B2 | 11/2005 | Vergeest et al. | 385/123 |
| 7,029,187 B2 * | 4/2006 | Chapman et al. | 385/96 |
| 7,082,250 B2 * | 7/2006 | Jones et al. | 385/134 |
| 7,142,741 B2 * | 11/2006 | Osborne | 385/15 |
| 7,147,384 B2 | 12/2006 | Hardcastle et al. | 385/60 |
| 7,264,403 B1 * | 9/2007 | Danley et al. | 385/60 |
| 7,377,700 B2 * | 5/2008 | Manning et al. | 385/72 |
| 8,109,679 B2 | 2/2012 | Danley et al. | 385/85 |
| 2003/0068138 A1 * | 4/2003 | Jack et al. | 385/80 |
| 2003/0235373 A1 | 12/2003 | Ishii et al. | |
| 2004/0020906 A1 * | 2/2004 | Ohta | 219/121.72 |

(Continued)

FOREIGN PATENT DOCUMENTS

| | | |
|---|---|---|
| EP | 0574015 B1 | 1/2001 |
| JP | 4-326309 A | 11/1992 |
| JP | 10-221568 A | 8/1998 |
| WO | WO 2005045494 A1 * | 5/2005 |

OTHER PUBLICATIONS

Laser Cleaving of Optical Connectors, IEEE Xplore Abstract Sheet, downloaded from internet on Feb. 3, 2016, 2 pages.

(Continued)

*Primary Examiner* — Michelle R Connelly

(57) ABSTRACT

A fiber optic connector includes a ferrule. The ferrule includes an inner piece including silica and an outer piece including ceramic. The outer piece surrounds the inner piece and the inner piece extends beyond an end of the outer piece by a distance of at least 10 micrometers.

19 Claims, 4 Drawing Sheets

(56) References Cited

U.S. PATENT DOCUMENTS

| | | | |
|---|---|---|---|
| 2008/0188843 A1* | 8/2008 | Appling et al. | 606/15 |
| 2009/0226136 A1* | 9/2009 | Shimizu et al. | 385/60 |
| 2010/0104243 A1* | 4/2010 | Kewitsch | 385/60 |
| 2012/0263422 A1* | 10/2012 | Lu | 385/85 |
| 2013/0343710 A1* | 12/2013 | Danley et al. | 385/85 |
| 2014/0072262 A1* | 3/2014 | Ohara | 385/39 |
| 2014/0105546 A1* | 4/2014 | Baca et al. | 385/78 |
| 2014/0105547 A1* | 4/2014 | Baca et al. | 385/78 |

OTHER PUBLICATIONS

Laser Polishing of Optical Fiber End Surface, Optical Engineering, SPIE Digital Library, downloaded from internet on Feb. 3, 2016, 7 pages.

Laser-Induced Fracturing: An Alternative to Mechanical Polishing and Patterning of LiNbO3 Integrated Optics Chips, Journal of Lightwave Technology, OSA Publishing, vol. 22, Issue 5, downloaded from internet on Feb. 3, 2016, 3 pages.

* cited by examiner

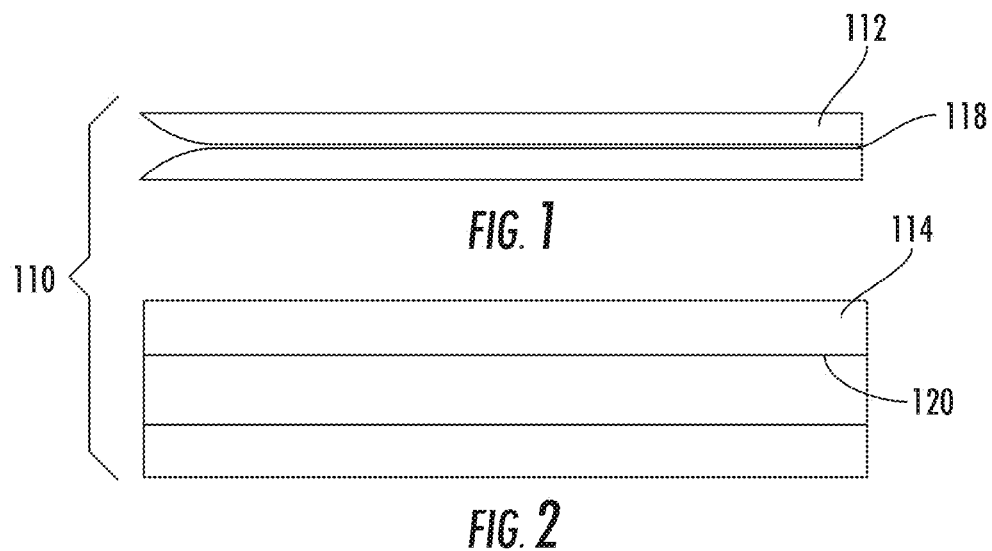
FIG. 1
FIG. 2
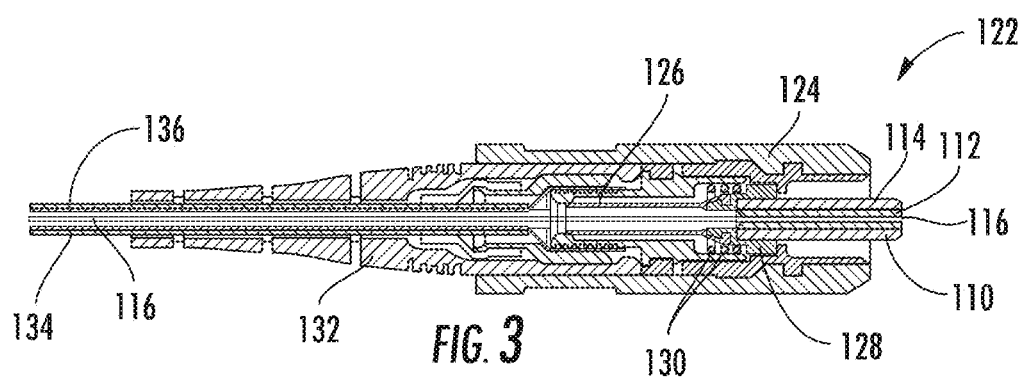
FIG. 3
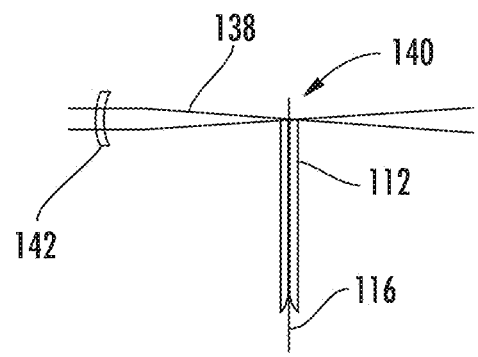
FIG. 4
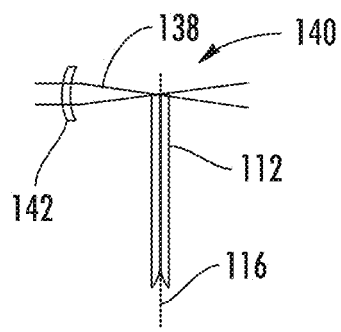
FIG. 5

FIBER OPTIC CONNECTOR

RELATED CASES

This application claims the benefit of priority under 35 U.S.C. §119 of U.S. Provisional Application Ser. No. 61/752, 697 filed on Jan. 15, 2013 the content of which is relied upon and incorporated herein by reference in its entirety.

BACKGROUND

Aspects of the present disclosure relate generally to fiber optic connectors, ferrules that may be used with fiber optic connectors, and methods of manufacturing ferrules and connectors.

Ferrules in use today are often made of zirconia because zirconia ferrules tend to be particularly durable and the manufacturers can produce zirconia ferrules with high-precision dimensional tolerances at very low cost. The color of zirconia ferrules is generally a distinct glossy white and their overall appearance is generally the same, regardless of the manufacturer.

Mechanical polishing is typically used when manufacturing fiber optic connectors with ferrules and associated optical fibers because mechanical polishing is an industry-proven way to achieve a fiber and ferrule geometry that is compliant with current international standard specifications, such as having a fiber height of ±100 nm from the ferrule end face, depending on connector type and radius of curvature and apex offset. Mechanical polishing is also capable of removing excess epoxy on the end face.

One problem with zirconia ferrules is that the zirconia may not survive direct contact with high quantities of laser power. Contact with the laser beam may cause micro-cracking of the zirconia. Therefore it is generally difficult to laser process a short glass fiber protruding from the zirconia ferrule. As such, conventional laser-cut fibers have a significant length of the fibers protruding from the end face of a zirconia ferrule to prevent damage to the zirconia. This length is typically greater than 50 µm and since the industry standard for fiber protrusion is +/−100 nm, additional processing is typically needed.

A need exists for a ferrule system that facilitates laser processing of optical fibers at a close distance to the ferrule, such as a distance less than 50 µm from the end face of the ferrule.

SUMMARY

Inventive and innovative technology disclosed herein includes a fiber optic connector having a ferrule configured to facilitate a manufacturing process to achieve industry-standard specifications for the geometry of the end face of the ferrule on a terminated optical cable assembly. The ferrule includes two or more pieces.

In some embodiments, an outer piece of the ferrule includes zirconia to provide strength and durability for the ferrule, while maintaining the overall appearance of a conventional ferrule. An inner piece of the ferrule includes a material, such as fused silica, that melts and/or ablates in a manner similar to silica-based optical fibers. The ferrule facilitates laser-forming and processing of the optical fiber in one process step, and the inner piece may subsequently be inserted into and secured within the outer piece of the ferrule.

One embodiment relates to a method of manufacturing a fiber optic connector. The method includes a step of stripping an optical fiber of one or more polymeric coatings to expose a glass cladding of the optical fiber. The method includes another step of inserting the optical fiber into an inner piece of a ferrule, where the inner piece includes silica. Further, the method includes steps of processing the optical fiber in the inner piece of the ferrule using a laser and, subsequent to the processing step, inserting the inner piece of the ferrule into an outer piece of the ferrule. The outer piece includes a ceramic material that is more durable than the inner piece.

Another embodiment relates to a ferrule for a fiber optic connector, which includes an inner piece including a first material and an outer piece including a second material. The outer piece surrounds the inner piece, and the inner piece extends beyond an end of the outer piece. Yet another embodiments relates to a fiber optic connector including such a ferrule, where the inner piece extends beyond the end of the outer piece by a distance of at least 10 micrometers.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which:

FIG. 1 is a side sectional view of an inner piece of a ferrule according to an exemplary embodiment.

FIG. 2 is a side sectional view of an outer piece configured to support the inner piece of FIG. 1 according to an exemplary embodiment.

FIG. 3 is a side sectional view of fiber optic connector according to an exemplary embodiment.

FIGS. 4-5 are side schematic views of the inner piece of FIG. 1 with an optical fiber therein, depicting two different depth of focus and spot-size setups for laser processing the optical fiber according to an exemplary embodiment.

DETAILED DESCRIPTION

Figure 6:
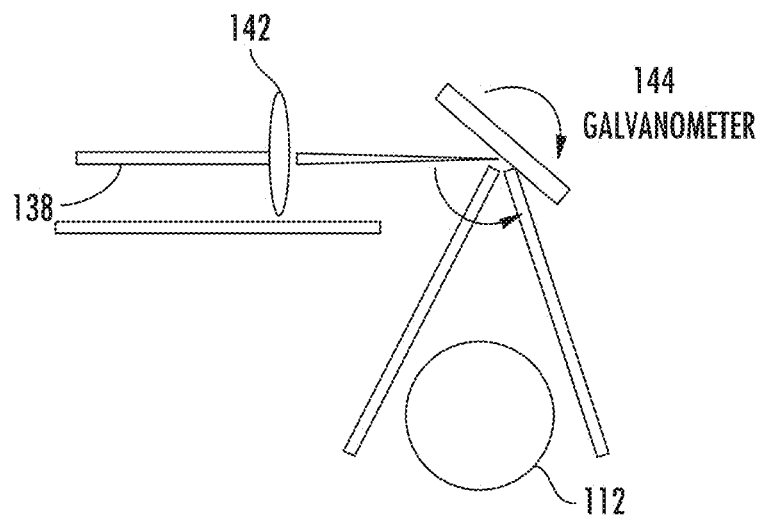
FIG. 6 is a schematic diagram of a manufacturing assembly including a galvanometer to scan a focused laser beam for processing of the optical fiber according to an exemplary embodiment.

Before turning to the Figures, which illustrate exemplary embodiments now described in detail, it should be understood that the present inventive and innovative technology is not limited to the details or methodology set forth in the Detailed Description or illustrated in the Figures. For example, as will be understood by those of ordinary skill in the art, features and attributes associated with embodiments shown in one of the Figures may be applied to embodiments shown in others of the Figures.

Referring to FIGS. 1-2, a ferrule 110 (e.g., composite ferrule, two-piece ferrule) includes an inner piece 112 (e.g., inner ferrule, insert, first structure; see FIG. 1) and an outer piece 114 (e.g., exterior ferrule, shell, second structure; see FIG. 2). The inner piece 112 includes a bore 118 for an optical fiber 116 (FIG. 3) and the inner piece 112 is sized and configured to fit into an interior passage 120 (e.g., bore) defined by the outer piece 114. In some embodiments, the outer piece 114 includes a durable ceramic (e.g., zirconia) or other material (e.g., polymer), and the inner piece 112 includes a silica-based material and/or glass. The inner piece 112 may have ablation and melt characteristics in common with cladding of the optical fiber 116, where the optical fiber 116 has a glass transmission core surrounded by the cladding.

According to an exemplary embodiment, the optical fiber 116 may be installed in the inner piece 112, laser processed, and then (i.e., subsequently thereto) inserted into the outer piece 114. According to an exemplary embodiment, the radius of curvature and apex offset of the optical fiber 116 (on the end thereof) may be controlled by the laser process and the height of the optical fiber 116 relative to the adjoining end face 140 (FIG. 4) of the ferrule 110 is within ±100 nanometers (nm).

The relative height H of the inner piece 112 to the outer piece 114 (see FIG. 9) may not be particularly significant, in some such embodiments, because the optical fiber 116 is processed within the inner piece 112 and ready for use, prior to insertion of the inner piece 112 (and optical fiber 116) into the outer piece 114. In other embodiments, sufficient relative height H of the inner piece 112 to the outer piece 114 may facilitate laser processing without damaging the outer piece 114, such as with embodiments in which the optical fiber 116 is at least partially laser processed (e.g., laser polished) while the inner piece 112 is positioned in the outer piece 114.

According to an exemplary embodiment, the material of the inner piece 112 is primarily (e.g., at least 50% by volume, at least 70% by volume, consists essentially of, consists entirely of) fused silica or another material that will process in a manner similar to the optical fiber 116. For example, if the optical fiber 116 is made from a material other than glass, the inner ferrule material 112 could be selected to match the material of the optical fiber 116. Accordingly, the material of the inner piece 112 of the ferrule 110 is selected and configured to melt and/or ablate using a laser of a particular wavelength and power that may also cut (i.e. cleave), shape (i.e. machine), bond (i.e. partially melt), and/or polish the optical fiber 116.

Figure 13:
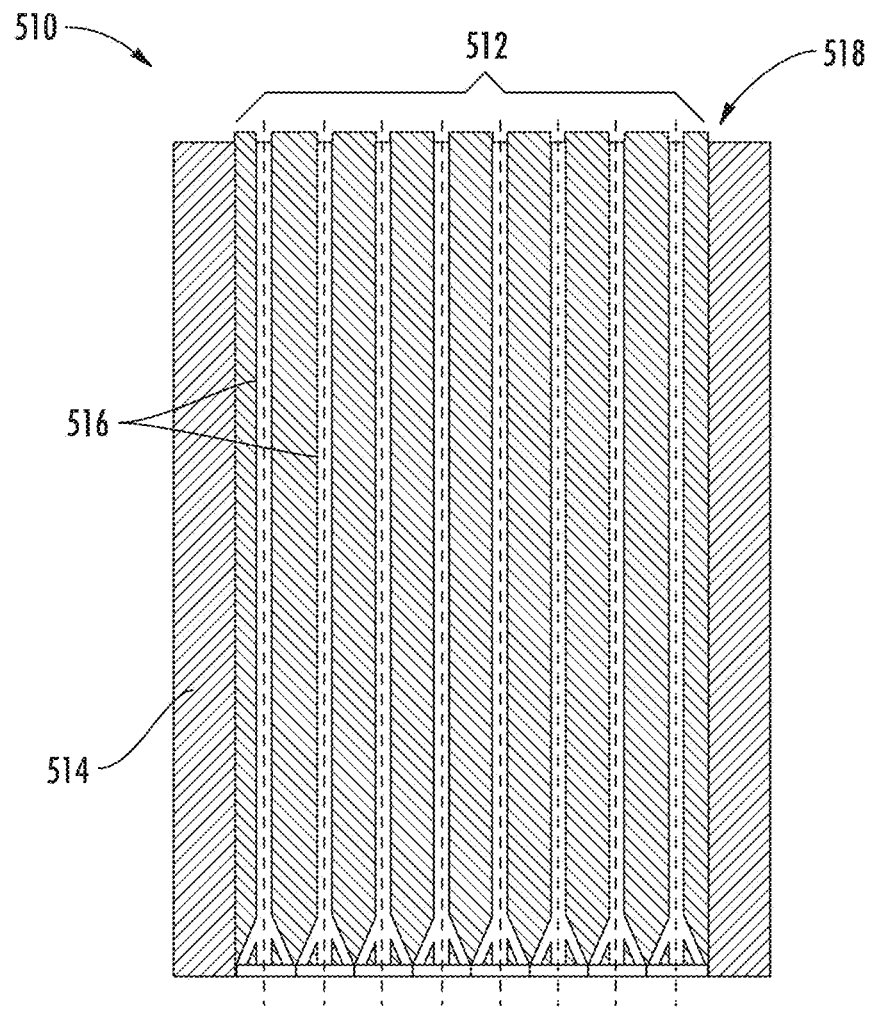
FIG. 13 is a side sectional view of a multi-fiber ferrule according to an exemplary embodiment.

Referring to FIG. 3, once the optical fiber 116 and ferrule 110 are fully assembled and processed, the ferrule 110 may be used in a fiber optic connector 122. The connector 122 may include a housing 124, a seat or holder 128 for the ferrule 110, a lead-in tube 126, a boot 132, and/or a spring 130 between the ferrule holder 128 and the housing 124. The connector 122 may be attached to an end of the optical fiber 116, which may be carried within the jacket 136 of a fiber optic cable 134. The optical fiber 116 may be a single mode optical fiber, a multi-mode optical fiber, a multi-core optical fiber, one of multiple optical fibers, one of multiple optical fibers forming a ribbon of optical fibers, or another type or configuration of optical fiber. As shown in FIG. 13, concepts and features disclosed herein may be used with a multi-fiber ferrule 510 having a face 518, where the insert(s) (or inner piece 512) includes bores for multiple optical fibers 516, and the inner piece may be inserted in an outer ferrule 514.

Referring now to FIGS. 4-5, once an appropriate material for the inner piece 112 of the ferrule 110 has been selected, a laser beam 138 may be shaped and focused at an appropriate angle and position relative to the fiber/ferrule end face 140 intersection. The laser beam 138 may be shaped using custom optical systems or diffractive optical elements (e.g., lens 142). Using a pulsed- or continuous-wave beam 138, energy is delivered to the optical fiber 116 and inner piece 112 of the ferrule 110. The energy may melt and/or ablate materials of the optical fiber 116 and inner piece 112, simultaneously, for cutting, for bonding, for polishing, to achieve a desired shape, or for other reasons.

Silica may be used as a material of the inner ferrule 112 because silica may share common material properties with silica optical fibers having germania-doped cores. The optical fiber 116 may be bonded to the ferrule 110 using any method that yields acceptable results. In some embodiments, the fiber 116 is bonded to the ferrule 110 using a $CO_2$ laser, such as by laser welding; and both forming and bonding the fiber 116 may be accomplished with a common laser (e.g., beam of same wavelength), such as during the same manufacturing step. The resulting assembly of the ferrule 110 and the optical fiber 116 may then be placed into a port or fixture that registers the position of the ferrule 110. With understanding of the position of the ferrule 110 (and components thereof) a $CO_2$ laser beam may be shaped, focused, and aligned relative to the ferrule 110 for further processing.

Figure 7:
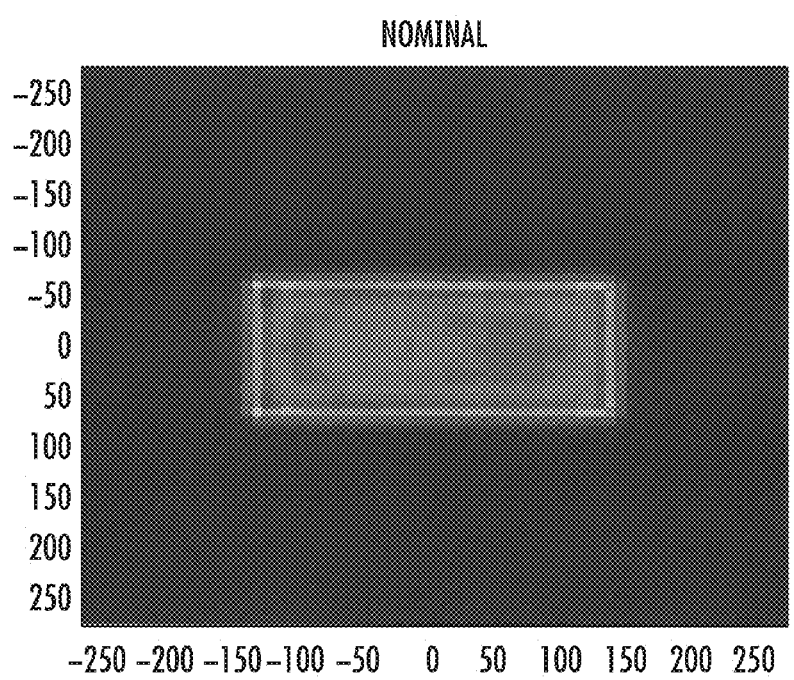
FIG. 7 is a diagram of an energy distribution of a laser beam shown from a diffractive optical element.

Referring now to FIGS. 6-7, for some laser/fiber-ferrule combinations it may be preferable to have relative motion between the laser beam 138 and fiber-ferrule assembly 112/116. An example would be to focus the laser beam 138 to a point and then sweep the laser beam 138 back and forth across the fiber-ferrule assembly 112/116, cutting and polishing the ferrule 112 and optical fiber 116. A 1-D galvanometer 144 scanning system or a laser-scanning head may be used to achieve this relative motion (see FIG. 6). In other embodiments, a mirror may be attached to a linear stage, instead of a rotating galvanometer 144. The focal length of the focusing lenses 142 would be long enough to produce a depth of focus, to thereby produce a substantially flat ferrule/fiber end face 140, although the ferrule end face 140 and fiber 116 may not be perfectly flat. For example, the substantially flat ferrule/fiber end face 140 may have a radius of curvature of about 1 to 30 mm, or more preferably about 5 to 25 mm depending on the connector type.

The laser is selected to produce enough energy to maintain an acceptable energy density. For example, in some embodiments the energy distribution of the laser beam 138 is at least about 10,000 $W/mm^2$. A diffractive optic that can shape the energy distribution is another viable alternative to sweeping the beam 138. Companies such as Holo-Cor (a division of Laser Components) may provide the ability to produce a uniform energy distribution and shape (see, e.g., beam spot of FIG. 7) the beam 138 into a block that is wider than the ferrule 110. A diffractive optic made out of ZnSe may be made to produce this energy distribution at focus, given a standard laser beam input (other diffractive optic materials and geometries are contemplated). The distribution can then be pulsed to cut and polish the fiber-ferrule assembly 112/116 without the need to translate the beam 138 or the fiber-ferrule assembly 112/116. The laser and optics may be sized to match the necessary energy distribution to properly cut and polish the ferrule 110. A 150 μm by 300 μm energy distribution is shown in FIG. 7 as an example of such an energy distribution.

An exemplary product and process may include stripping a 250 μm acrylate coating off of the optical fiber 116 using a 9.3- or 10.6-μm $CO_2$ laser (e.g., the laser having at least 400 W capacity), then inserting the prepared fiber 116 into the inner piece 112 of the ferrule 110 to a predetermined position. The end face 1140 of the ferrule 110 may already be positioned appropriately relative to the laser. The laser beam 138 would then thermally form the end face 140 of both the optical fiber 116 and the ferrule 110 simultaneously, and bond them together in the radial and/or longitudinal axis of the optical fiber 116. In some embodiments, the resulting geometry of the end face 140 and the visual quality is compliant with industry standards.

In other contemplated embodiments, the ferrule 110 may be rotated during laser processing to achieve a uniform shape of the end face 140. Such rotation may be a partial rotation, a rocking motion, a full 360-degree turn, and/or a continuous spinning rotation.

Once the inner piece 112 of the ferrule 110 and the optical fiber 116 have been processed, the assembly 112/116 may be inserted into the outer piece 114 of the ferrule 110, positioned and aligned, and locked into place with any acceptable means. Some such means include chemical adhesives (e.g., thermoplastic, thermoset) and/or mechanical interlocks (e.g., friction fit, flange or latch). The optical fiber 116 position relative to the outer diameter of the outer piece 114 of the ferrule 110 may be adjusted before locking the inner piece 112 of the ferrule 110 in place, to provide concentricity of the optical fiber 116 within the ferrule 110.

Figure 8:
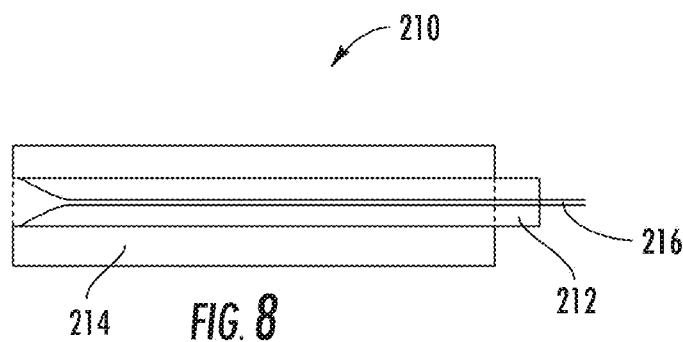
FIG. 8 is a side sectional view of a ferrule for a fiber optic connector according to another exemplary embodiment.
Figure 9:
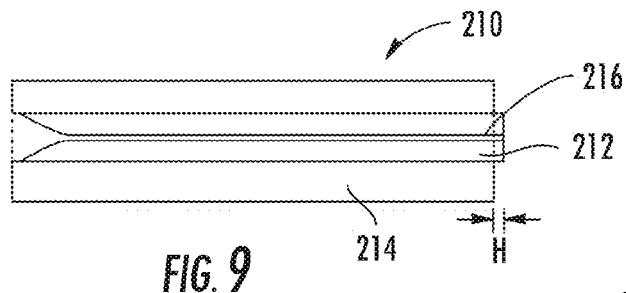
FIG. 9 is a side sectional view of the ferrule of FIG. 8 after the ferrule has been further processed according to an exemplary embodiment.

Referring now to FIGS. 8-9, a fiber and glass insert 212 may be preassembled into a zirconia outer ferrule 214 of a ferrule 210, such as with some length H of the insert 212 protruding from the end face of the zirconia ferrule 214. In such embodiments, an optical fiber 216 may be partially processed, such as bonded to the glass insert 212, but not fully processed, such as being polished and ready for use. The laser cut/polish process may then cut the glass insert 212 and optical fiber 216 simultaneously, as close to the zirconia outer ferrule 214 as possible without damaging the zirconia outer ferrule 214, such as a distance of less than 5 mm but greater than about 10 μm. Once further laser processed, as shown in FIG. 9, the protruding portion of the glass insert 212 and optical fiber 216 may meet precision industry standard specifications such as being within ±100 nm of the end face of the ferrule 210.

Figure 10:
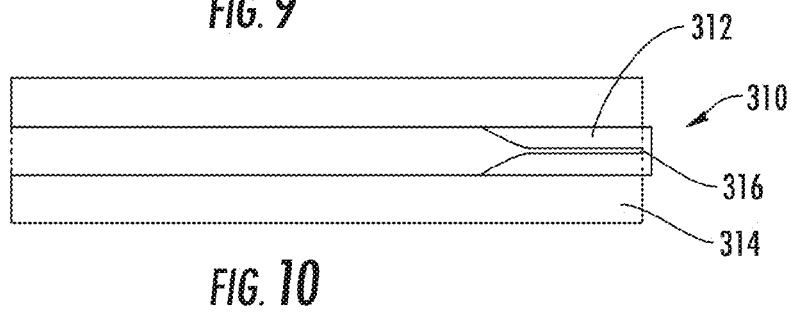
FIG. 10 is a side sectional view of a ferrule for a fiber optic connector according to yet another exemplary embodiment.
Figure 11:
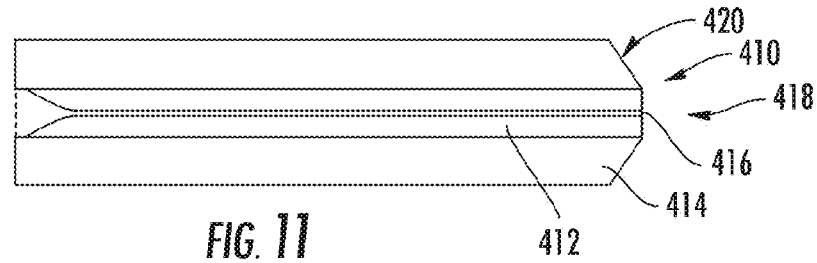
FIG. 11 is a side sectional view of a ferrule for a fiber optic connector according to another exemplary embodiment.

Referring to FIG. 10, a short glass inner ferrule 312 having an optical fiber 316 may be a counter-bored into a zirconia outer ferrule 314 of a composite ferrule 310. The counter-bore may limit movement of the inner ferrule 312 during mating loads. Referring now to FIG. 11, a chamfered zirconia outer ferrule 414 with bevel 420 may allow a laser to get closer to a zirconia face thereof without damaging a face 418 thereof, resulting in a shorter protrusion length of an inner ferrule 412 and the optical fiber 416 of such a ferrule 410. Both the ferrules 310, 410 may be processed preassembled, as in FIG. 8, or as previously discussed, may be processed unassembled, cut, and then subsequently bonded. Further, the bevel 420 of FIG. 11 and/or shorter inner ferrule 312 and counter-bore of FIG. 10 may be incorporated in alternative embodiments of the other ferrules 110, 210, 510 disclosed herein.

Figure 12:
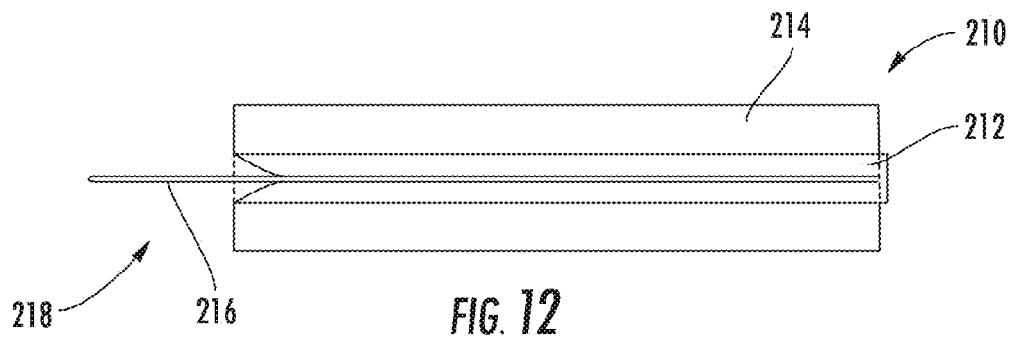
FIG. 12 is a side sectional view of the ferrule of FIG. 9 with a stub of an optical fiber extending therefrom according to another exemplary embodiment.

Referring to FIG. 12, the two-piece ferrule 210 is processed with a short fiber stub 218 protruding from the back of the ferrule 210. The processed stub 218 is splice-ready and may be fusion spliced and/or used in a mechanical splice package, such as UNICAM® manufactured by Corning Cable Systems (a subsidiary of Corning Incorporated) of Hickory, N.C. As discussed above, embodiments disclosed herein may be used with single-fiber connectors, as shown in FIG. 3; or as shown in FIG. 13, with ferrules 510 of multi-fiber connectors.

Advantages of technology disclosed herein, in some embodiments, include reduction and/or elimination of mechanical polishing of the optical fiber 116 and ferrule end face 140; reduction and/or elimination of consumables for mechanical polishing; reduction of overhead costs to manage polishing equipment and consumables; reduction of process variation, defects, and scrap; reduction in manufacturing cycle time; the ability to implement a single connector manufacturing process using automated lasers, reduction in process steps for connector termination, reduction in labor content per connector termination, reduction in operator influence on process outcome, improved end face 140 visual quality and geometry, process flexibility, maintaining of overall appearance of current ferrules/connectors.

The construction and arrangements of the ferrules and fiber optic connectors, as shown in the various exemplary embodiments, are illustrative only. Although only a few embodiments have been described in detail in this disclosure, many modifications are possible (e.g., variations in sizes, dimensions, structures, shapes, and proportions of the various members, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive and innovative technology.

What is claimed is:

1. A method of manufacturing a fiber optic connector, comprising:
   stripping an optical fiber of one or more polymeric coatings to expose a glass cladding of the optical fiber;
   inserting the optical fiber into an inner piece of a ferrule, wherein the inner piece comprises fused silica;
   processing the optical fiber in the inner piece of the ferrule using a laser;
   subsequent to the processing step, inserting the inner piece of the ferrule into an outer piece of the ferrule, wherein the outer piece comprises zirconia that is more durable than the inner piece; and
   installing the ferrule into a fiber optic connector after the optical fiber and ferrule are fully assembled and processed, wherein the fiber optic connector forms an end of a fiber optic cable having the optical fiber surrounded by a jacket;
   wherein inserting the ferrule into the fiber optic connector comprises positioning the ferrule within a holder, the holder being positioned within a housing, and the ferrule further positioned at the end of a lead-in tube.

2. The method of claim 1, wherein the processing step comprises laser cleaving the optical fiber.

3. The method of claim 1, wherein the processing step comprises bonding the optical fiber to the inner piece of the ferrule by laser welding.

4. The method of claim 1, wherein the processing step comprises bonding the optical fiber to the inner piece of the ferrule by activating a bonding agent using the laser.

5. The method of claim 1, wherein the processing step comprises polishing an end of the optical fiber with the laser.

6. The method of claim 1, wherein the stripping step comprises ablating one or more polymeric coatings on the optical fiber using the laser.

7. The method of claim 1, further comprising laser processing a stub portion of the optical fiber that extends rearward from the fiber optic connector.

8. The method of claim 1, wherein processing the optical fiber further comprises:
using the laser to thermally form an end face of both the optical fiber and the inner piece simultaneously and bond them together.

9. The method of claim 1, further comprising:
providing a spring between the housing and the holder.

10. The method of claim 1, further comprising:
providing a boot between the housing and the optical fiber.

11. The method of claim 1, wherein inserting the inner piece of the ferrule into the outer piece of the ferrule comprises positioning an end face of the inner piece substantially at or beyond an end face of the outer piece.

12. The method of claim 1, wherein processing the optical fiber in the inner piece of the ferrule using the laser comprises providing relative motion between a laser beam and the optical fiber.

13. A method of manufacturing a fiber optic connector, comprising:
stripping an optical fiber of one or more polymeric coatings to expose a glass cladding of the optical fiber;
inserting the optical fiber into an inner piece of a ferrule, wherein the inner piece comprises fused silica;
bonding the optical fiber to the inner piece;
processing the optical fiber in the inner piece of the ferrule using a laser, wherein the laser is used to control a radius of curvature and apex offset of the optical fiber relative to an end face of the inner piece;
subsequent to the processing step, inserting the inner piece of the ferrule into an outer piece of the ferrule, wherein the outer piece comprises zirconia that is more durable than the inner piece; and
installing the ferrule into a fiber optic connector after the optical fiber and ferrule are fully assembled and processed, wherein the fiber optic connector forms an end of a fiber optic cable having the optical fiber surrounded by a jacket;
wherein installing the ferrule into the fiber optic connector comprises positioning the ferrule within a holder, the holder being positioned within a housing, and the ferrule further positioned at the end of a lead-in tube.

14. The method of claim 13, wherein processing the optical fiber in the inner piece with the laser results in a height of the optical fiber relative to the end face of the inner piece being within ±100 nanometers (nm).

15. The method of claim 13, further comprising:
adjusting the position of the optical fiber relative to an outer diameter of the outer piece to adjust concentricity of the optical fiber within the ferrule; and
locking the inner piece of the ferrule in place within the outer piece.

16. A method of manufacturing a fiber optic connector, comprising:
inserting multiple optical fibers into respective bores of an inner piece of a ferrule, wherein the inner piece comprises fused silica;
bonding the multiple optical fibers to the inner piece;
processing the multiple optical fibers in the inner piece of the ferrule using a laser;
subsequent to the processing step, inserting the inner piece of the ferrule into an outer piece of the ferrule, wherein the outer piece comprises zirconia that is more durable than the inner piece; and
installing the ferrule into a fiber optic connector after the optical fiber and ferrule are fully assembled and processed, wherein the fiber optic connector forms an end of a fiber optic cable having the optical fiber surrounded by a jacket,
wherein installing the ferrule into the fiber optic connector comprises positioning the ferrule within a holder, the holder being positioned within a housing, and the ferrule further positioned at the end of a lead-in tube.

17. The method of claim 16, wherein processing the multiple optical fibers comprises using the laser control a radius of curvature and apex offset of the multiple optical fibers relative to an end face of the inner piece.

18. The method of claim 17, wherein processing the multiple optical fibers in the inner piece with the laser results in a height of each optical fiber relative to the end face of the inner piece being within ±100 nanometers (nm).

19. The method of claim 16, further comprising:
adjusting the position of one or more of the optical fibers relative to an outer diameter of the outer piece to adjust concentricity of the one or more optical fibers within the ferrule; and
locking the inner piece of the ferrule in place within the outer piece.

* * * * *